United States Patent
Baumann et al.

(10) Patent No.: US 7,502,973 B2
(45) Date of Patent: Mar. 10, 2009

(54) METHOD AND DEVICE FOR MONITORING A DISTRIBUTED SYSTEM

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE);
Bernd Goetzelmann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 10/560,124

(22) PCT Filed: May 4, 2004

(86) PCT No.: PCT/EP2004/050704

§ 371 (c)(1),
(2), (4) Date: Apr. 24, 2006

(87) PCT Pub. No.: WO2005/001692

PCT Pub. Date: Jan. 6, 2005

(65) Prior Publication Data

US 2006/0248409 A1    Nov. 2, 2006

(30) Foreign Application Priority Data

Jun. 23, 2003   (DE) .................................. 103 28 059

(51) Int. Cl.
*G06F 11/00* (2006.01)

(52) U.S. Cl. .......................................... 714/47; 714/12

(58) Field of Classification Search .................. 714/10, 714/11, 12, 43, 47
See application file for complete search history.

(56) References Cited

U.S. PATENT DOCUMENTS

| | | | | |
|---|---|---|---|---|
| 3,681,578 A * | 8/1972 | Stevens | ........................ | 714/11 |
| 3,783,250 A * | 1/1974 | Fletcher et al. | ............... | 714/11 |
| 3,876,987 A * | 4/1975 | Dalton et al. | .................. | 714/10 |
| 3,898,621 A * | 8/1975 | Zelinski et al. | ............... | 714/11 |
| 4,015,246 A * | 3/1977 | Hopkins et al. | ............... | 714/12 |
| 4,321,666 A | 3/1982 | Tasar et al. | | |
| 4,323,966 A * | 4/1982 | Whiteside et al. | ............... | 714/1 |
| 4,453,210 A * | 6/1984 | Suzuki et al. | .................. | 714/25 |
| 4,453,213 A * | 6/1984 | Romagosa | .................... | 714/30 |
| 4,757,442 A * | 7/1988 | Sakata | .......................... | 714/11 |
| 4,926,315 A * | 5/1990 | Long et al. | ..................... | 714/43 |
| 4,965,717 A * | 10/1990 | Cutts et al. | ..................... | 714/12 |
| 5,182,754 A * | 1/1993 | Koumoto et al. | ............... | 714/47 |
| 5,265,832 A * | 11/1993 | Wesling et al. | ........... | 246/169 R |
| 5,280,515 A * | 1/1994 | Nagatsu | .................... | 348/14.08 |
| 5,423,024 A * | 6/1995 | Cheung | ........................ | 714/11 |
| 5,453,737 A * | 9/1995 | Opoczynski | ................. | 340/2.8 |

(Continued)

FOREIGN PATENT DOCUMENTS

DE        195 00 188       7/1996

*Primary Examiner*—Robert Beausoliel
*Assistant Examiner*—Joshua P Lottich
(74) *Attorney, Agent, or Firm*—Kenyon & Kenyon LLP

(57) ABSTRACT

A method and device for monitoring a distributed system made up of a plurality of users that are connected by one bus system are provided, in which distributed system at least a number of the users are provided as monitoring users. The process data of at least one monitored user are filed in data areas of memory units of the bus system, to which the monitoring users have access, and the process data are evaluated by the monitoring users.

18 Claims, 4 Drawing Sheets

U.S. PATENT DOCUMENTS

| | | | |
|---|---|---|---|
| 5,485,573 A * | 1/1996 | Tandon | 714/25 |
| 5,666,483 A * | 9/1997 | McClary | 714/10 |
| 5,720,024 A * | 2/1998 | Saito et al. | 714/1 |
| 5,761,412 A * | 6/1998 | Higgins | 714/47 |
| 5,799,022 A * | 8/1998 | Williams | 714/797 |
| 5,884,018 A * | 3/1999 | Jardine et al. | 714/4 |
| 5,931,959 A * | 8/1999 | Kwiat | 714/48 |
| 6,073,251 A * | 6/2000 | Jewett et al. | 714/7 |
| 6,128,755 A * | 10/2000 | Bello et al. | 714/715 |
| 6,141,770 A * | 10/2000 | Fuchs et al. | 714/11 |
| 6,247,143 B1 * | 6/2001 | Williams | 714/11 |
| 6,263,452 B1 * | 7/2001 | Jewett et al. | 714/9 |
| 6,523,139 B1 * | 2/2003 | Banning et al. | 714/43 |
| 6,651,242 B1 * | 11/2003 | Hebbagodi et al. | 717/127 |
| 6,665,811 B1 * | 12/2003 | de Azevedo et al. | 714/4 |
| 6,732,300 B1 * | 5/2004 | Freydel | 714/36 |
| 6,754,846 B2 * | 6/2004 | Rasmussen et al. | 714/11 |
| 6,862,613 B1 * | 3/2005 | Kumar et al. | 709/220 |
| 6,928,583 B2 * | 8/2005 | Griffin et al. | 714/11 |
| 7,024,594 B2 * | 4/2006 | Pignol | 714/54 |
| 7,089,484 B2 * | 8/2006 | Chan et al. | 714/797 |
| 7,363,543 B2 * | 4/2008 | Peebles et al. | 714/26 |
| 7,373,557 B1 * | 5/2008 | Wise et al. | 714/47 |
| 2002/0010880 A1 * | 1/2002 | Williams | 714/43 |
| 2003/0061535 A1 * | 3/2003 | Bickel | 714/11 |
| 2005/0022054 A1 * | 1/2005 | Rasmussen et al. | 714/10 |
| 2007/0271486 A1 * | 11/2007 | Fitzgerald | 714/43 |

* cited by examiner

METHOD AND DEVICE FOR MONITORING A DISTRIBUTED SYSTEM

CROSS-REFERENCE TO RELATED APPLICATIONS

This application was filed as International Patent Application No. PCT/EP2004/050704 on May 4, 2004 and claims foreign priority benefits of German Patent Application No. 103 28059.6, filed Jun. 23, 2003.

FIELD OF THE INVENTION

The present invention relates to a method and a device for monitoring a distributed system made up of several users that are connected by a bus system.

BACKGROUND INFORMATION

Application of electronic control units in all technical fields, such as in industrial applications as, for instance, in the machine tool field or in automation, as well as in the vehicle field, and the networking of these control units, particularly in safety-relevant applications such as braking functions in the motor vehicle, e.g., ABS or ESP, steering functions or even transmission shifting functions as well as engine control functions, raise the problem of the safe operation of such a distributed system.

In this context, especially in the motor vehicle field, mixed mechanical/electronic ("mechtronic") systems are used these days. Today's mechatronic systems monitor the function of the system automatically, in that, for instance, redundancy is built in. In this context, the usual systems include, for each control unit or subsystem, two processors that compute the functions and then compare the results. If there is a difference in the results, a fault is deemed to have appeared, and measures relevant to safety are able to be initiated. In this context, the second processor is often designed to be more low-powered. In such a case, this second processor rechecks only selected sub-ranges, and compares them to the actual functional computer, as is described, for example, in published German patent document DE 195 00 188.

Transmitted to a distributed system means that each control unit of the subsystem is itself constructed so that it is able to automatically detect a fault, and then initiates fault-handling measures, that is, each subsystem is itself constructed redundantly for ascertaining the results. To produce the redundancy in the self-monitoring control units, these have to be constructed in a very costly manner, and components have to be integrated which would not be strictly necessary for the actual functioning of the control unit.

It is an object of the present invention to reduce this monitoring expenditure for each individual subsystem.

SUMMARY

The present invention provides transferring the essential monitoring functionality to the bus system itself. This makes possible the monitoring of distributed systems over the entire bus system, whereby, in an advantageous manner, the subsystems and control units or users may be constructed with reference to their own function, and additional monitoring expenditure may be largely avoided in this user construction.

To do this, the present invention provides a method and a device for monitoring a distributed system that is made up of several users which are connected by a bus system. In an expedient way, at least a number of the users is then provided as being monitoring users, and the process data of at least one monitored user are stored in data areas of memory units of the bus system to which the monitoring users have access, these process data being evaluated by the monitoring users.

Thus, in an advantageous manner, in a system having distributed intelligence, not every subsystem has to discover all relevant faults in itself and initiate necessary countermeasures, because this would bring up increased costs, and the full capacity present in the bus system would not be utilized. Thus, according to the present invention, one is able to do without parts of the monitoring devices by having portions of the monitoring taken over by other users, especially by the section of the bus system, i.e., the bus coupling-in unit, that is allocated individually to each user.

To do this, in an expedient manner, each of the data areas is uniquely assigned to one monitored user.

In this context, it is advantageous if the monitored user itself has no access to the data area assigned to it. In this context, on the one hand, the data areas may be distributed over the at least two memory units, so that virtual data areas, so to speak, are created and/or at least a part of the data areas is provided simultaneously in each memory unit, as a function of the access potential of the individual users.

For the monitoring itself, each monitoring user advantageously generates outcome data as a function of the evaluation of the process data of the monitored user. These outcome data for monitoring are generated by all monitoring users with the exception of the at least one monitored user itself, and come about from the evaluation of the process data, in particular in that the self-ascertained data for the processes are compared to those of the user that is to be monitored. Expediently, fault information and/or measures information will then be included in these outcome data. Therewith, on the one hand, the user to be monitored may be notified from an individual point of view of each monitoring user whether a fault is present, and which measures the respective monitoring user would initiate, based on the error present.

This advantageously takes place in that the outcome data are transmitted via the bus system to a communications controller of the bus system that is allocated to the monitored user. The evaluation of the outcome data may thus, for one thing, be carried out by the communications controller of the monitored user itself. If the outcome data are stored, in one example embodiment, in the data areas, especially the bus coupling-in unit, an evaluation may also be made by other users or other communications controllers beside the one of the monitored user.

Because of the method, device, bus system and distributed system according to the present invention, fewer measures that are cost-intensive may be used in the overall system for monitoring individual subassemblies or subsystems of the overall system, so that, in particular, the number of hardware components in the subsystems, and thereby the costs for these, may be lowered. Furthermore, without a greatly increased expenditure, a selection may be made by using the monitoring data, especially an N of M selection with respect to the outcome data, where N and M are natural numbers and M is greater than 2, and N being greater than M/2.

DETAILED DESCRIPTION

Figure 1:
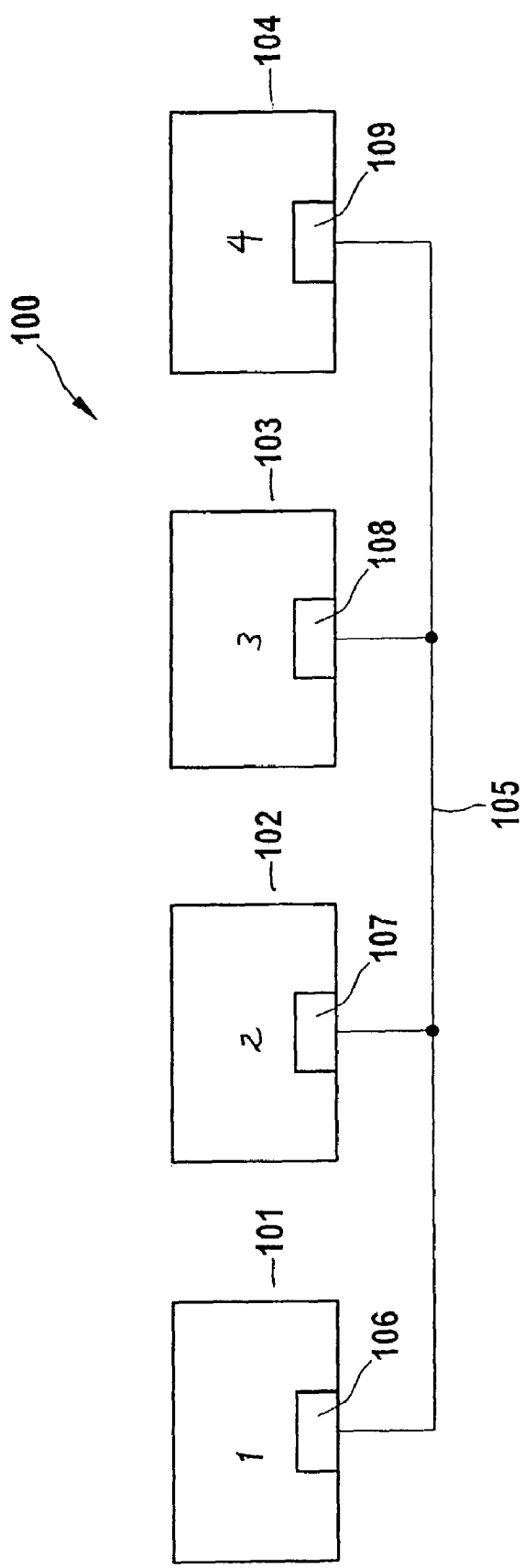
FIG. 1 shows a distributed system having several users, a user being made up of a corresponding subsystem and a bus coupling-in unit.

FIG. 1 shows a distributed system 100 having four users 101 to 104. In this context, each user is made up of a corresponding subsystem 1 to 4 and a bus coupling-in unit 106 to 109. These users 101 to 104 are connected to one another via a communications connection 105. According to the present invention, in this distributed system, the monitoring users, especially their bus coupling-in units, now also undertake parts of the monitoring of the at least one monitored user, for example, user 101 is monitored by users 102 to 104. At the same time, for instance, user 102 is monitored by users 101, 103 and 104, etc., so that each user is monitored with respect to each subsystem by at least two additional users of the distributed system.

If each user is monitored by at least three further users, a voting function, that is, a selection function, is also possible with respect to the judgment of the monitoring users with reference to the monitored user. For this, the monitoring users may transmit their estimation ("outcome data"), that is, the result of the monitoring concerning the functional condition of the at least one monitored user, via the communications connection to, e.g., the communications controller of the monitored user. These outcome data are then evaluated by the communications controller, whereupon the latter takes appropriate measures, if necessary. In this evaluation, a voting may then take place in such a way that, for example, in the case of three monitoring users, a 2 of 3 valuation may take place first for error detection and also for the initiation of measures. In this context, that user is able to be monitored by all other users of the distributed system, or by only a portion of the users, these users then being provided as monitoring users.

For the increase of security, especially in the case of a faulty subsystem, the subsystem itself, especially the computing unit of the subsystem, is not able to access the monitoring results, that is, the outcome data of the other users, so that the monitoring takes place independently on, and via, the bus system.

The distributed system according to FIG. 1 is consequently conceived in such a way that that parts of the functional monitoring may be processed outside the subsystem, in other words, in the other users or in the bus coupling-in unit. In the context of monitoring of subsystem 1, subsystem 1 files the process data on the data bus in the bus system. In this context, the process data are filed in data areas of memory units of the bus system in the bus coupling-in unit, as explained in further detail, in connection with the further drawings. Users 102 to 104, or rather subsystems 2 to 4, are able to access these process data in the data areas of memory units of the bus system and evaluate them, so that the monitoring is able to be achieved from these data. Each monitoring subsystem files its estimation, in the form of outcome data, on the condition of subsystem 1, that is, the monitored subsystem, again on the data bus, that is, the bus system, in special areas. These outcome data areas are assigned to the communications controller or the bus coupling-in unit or to an additional device that is especially provided therein, and are able to be evaluated by it.

These outcome data, on the one hand, include error data, that is, the estimation of the respective subsystem as to whether the monitored subsystem has a fault or not. On the other hand, this fault information may be evaluated in the form of an identification character in such a way that it may be positively stated in which process data, and thus at which functionality, an error was detected. Besides this fault information, which thus first permits a yes/no decision on the fault or is able to designate exactly the fault in an extended form (or the process or functionality it is based on), there may further be provided measures information in the outcome data. This means that, as a function of, for example, the type of fault or the type of process data at which the fault has appeared, or the type of process or functionality at which the fault was first observed, fault measures are able to be initiated in a differentiated manner. Such measures may consist in switching off a subsystem, the transition of a subsystem into operation under emergency conditions, or even normal continued operation at a low fault priority. In the case of a transition into operation under emergency conditions, in this context, a predefined program may be run, fixed values may be assumed, or a restricted functionality may be provided.

Consequently, in a simple case, voting may take place, i.e., an N of M selection, e.g., a 2 of 3 selection, having a fixedly predefined fault reaction or differentiated reaction as a function of the type of fault, and a special measure may be initiated, the allocation of measure to type of fault being able to take place, for instance, via a firmly predefined allocation table or other selection criteria.

In order, for instance, in the case of a faulty processor and thus a faulty computer unit of subsystem 1, to avoid endangering the evaluation of the data because of its own faultiness, the computer unit of subsystem 1, that is, of the monitored system, should not have any possibility of accessing the special data areas with respect to the outcome data in the memory units of the bus system that are allocated to this subsystem 1.

Figure 2:
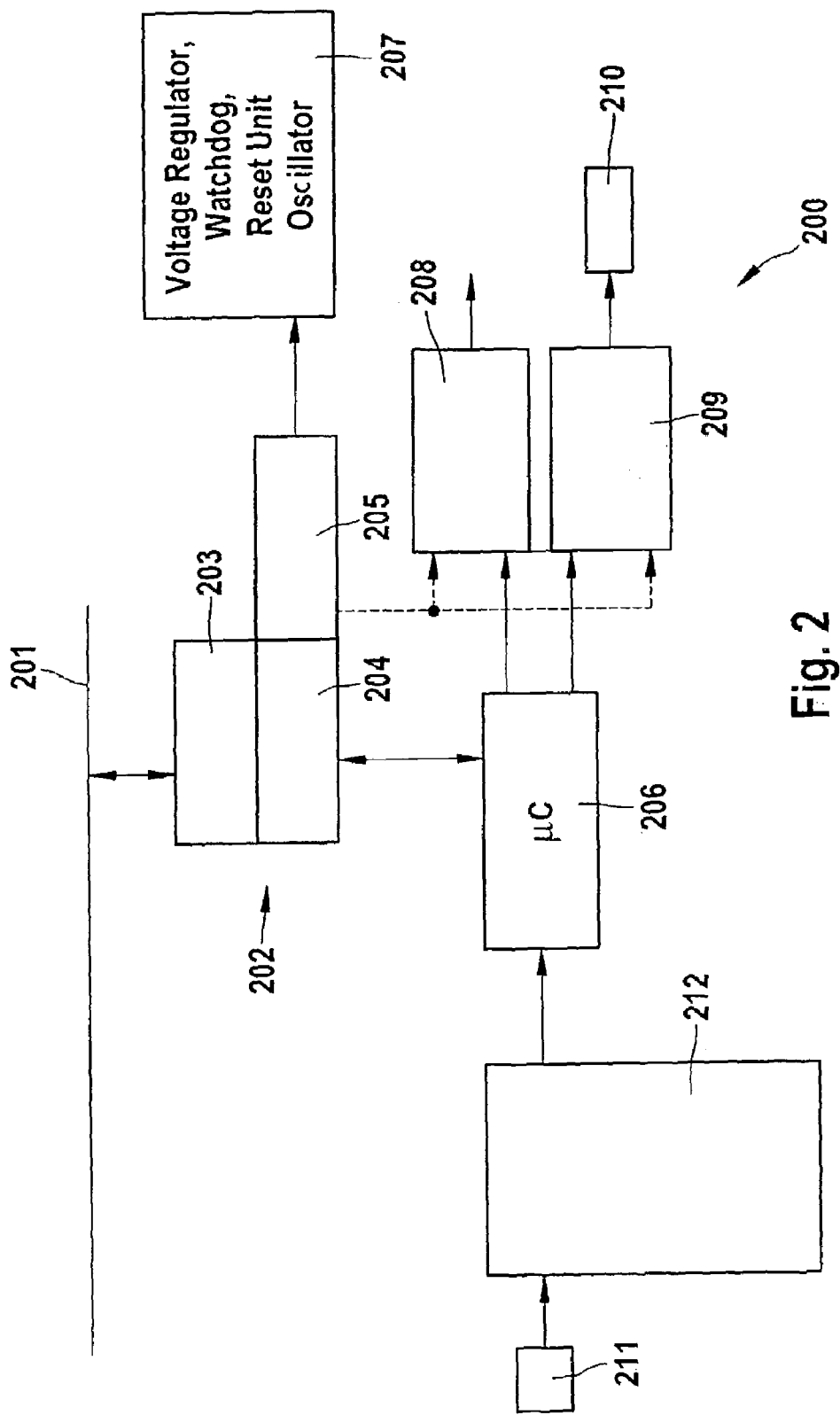
FIG. 2 shows a detailed illustration of a user and the way it ties in with the communications connection.

FIG. 2 shows in detail such a user, which is coupled into communications connection 201. The coupling into this communications connection 201 takes place via a bus coupling-in unit 202 which is made up of a transceiver 203, a communications controller 204, and the memory unit of a monitoring register 205. The subsystem is connected to this bus coupling-in unit via a computer unit 206, which represents the control unit or the μC of the subsystem. This subsystem includes input data delivered by sensors 211 via a sensor signal adaptation unit 212, such sensor data being also able to be delivered to the computer unit via the communications connection and the bus coupling-in unit. This applies, for example, to intelligent sensor systems which, on their part, are connected to the communications connection.

Starting from these input data, output signals are generated by computer unit 206 and a power unit 209 is activated which, on its part, in turn operates actuators 210. In similar fashion, additional signal outputs are optionally possible via a signal adaptation unit 208.

The monitoring register or bus coupling-in unit 202 is in direct connection to a fault unit 207. Thereby, the bus coupling-in unit, especially communications controller 204, may emit signals starting from the data in the data areas of monitoring register 205, for instance, to a reset unit, a voltage regulator, an oscillator and/or a watchdog, for example.

In user 200 according to FIG. 2, made up of the corresponding subsystem and the bus coupling-in unit, the monitoring data, that is, on the one hand, the process data of the monitored user, and, on the other hand, the outcome data of the other users, to the extent that it is monitored itself, find their way directly from communications controller 204 into the monitoring register, that is, the data areas of memory unit 205. In these data areas a weighting may take place just, for example, by voting, as to which measures are to be initiated.

If subsystems 2 to 4, or rather users 102 to 104, agree that subsystem 1 is performing its function in a faulty manner, or if such an estimation is revealed, for instance, from a corresponding voting, for example, from a 2 of 3 selection, then, for instance, subsystem 1 may be reset, that is, set back, shut off completely, or have power unit 209 deactivated, for example. Such a fault reaction, as was described above, may also be implemented by the bus coupling-in unit while circumventing computer unit 206, optionally by direct activation of power unit 209 or signal adaptation unit 208, as indicated by the dashed arrows in FIG. 2.

If, among several subsystems or users, only one user is of the opinion that subsystem 1 has a fault, it is conceivable that, instead of in the monitored subsystem, a fault is in this monitoring subsystem which has detected the error. Since, as was described in connection with FIG. 1, each subsystem of the distributed system is able to be tested using this method, this subsystem may now be examined for faults. Thus the process data of this subsystem are then evaluated, i.e., the subsystem that has mistakenly detected faults is tested on its part. This consequently prevents a faulty switching off. In addition, insufficient or incorrect fault reactions and measures are prevented.

Figure 3:
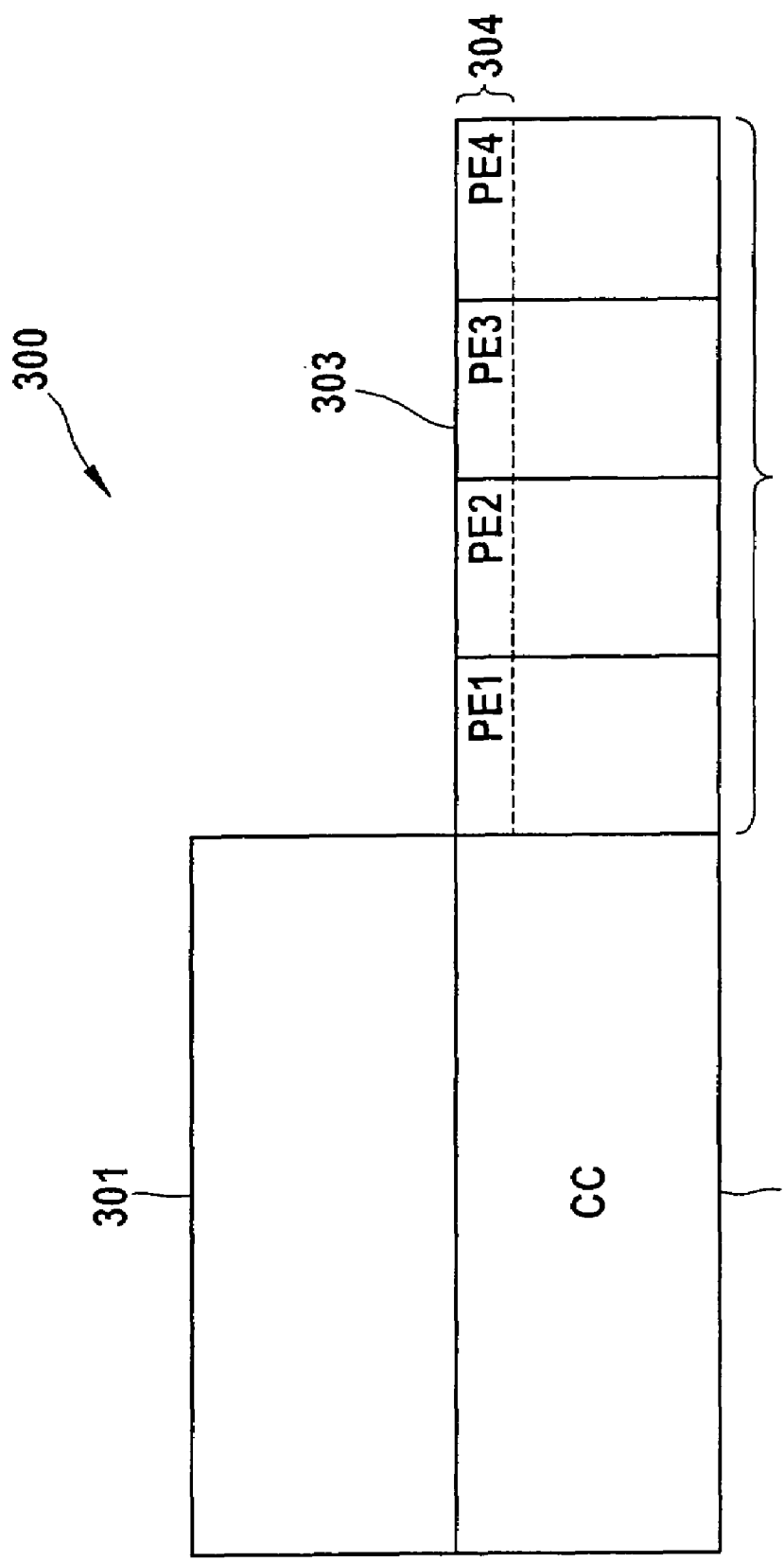
FIG. 3 shows the bus coupling-in unit with the data areas according to the present invention.

FIG. 3 shows, as an example, a bus coupling-in unit 300 having a transceiver 301, a communications controller 302 as well as a memory unit, that is, monitoring register 303. This monitoring register is here divided into four data areas, for example, T1, T2, T3 and T4, corresponding to the number of monitored users or users to be monitored. These data areas T1 to T4 may again be divided on their part, so that, on the one hand, the process data of the corresponding user may be input, and, on the other hand, the corresponding outcome data may be allocated. These data areas may be provided to be identical in each bus coupling-in unit, corresponding to the number of monitored and monitoring users any other combinations being possible, conceivably and according to the present invention.

Consequently, during the monitoring of user T1, the process data of this user are input in T1. The monitoring users now evaluate these process data and set up outcome data from this evaluation. For the input of the outcome data, there are various possibilities. For one thing, all outcome data of the individual users may be input into the data area of the monitored user, whereby, for example, by using an identification character, an allocation of the data to the respective monitoring user is made possible. The communications controller now undertakes a valuation of these outcome data, by comparison or voting, and initiates an appropriate fault reaction.

In addition to the above example, the corresponding data may be input to the data area allocated to the respective user, so that the respective process data of the corresponding user are input and special areas PE2 to PE4 are allocated by T1 to these process data in PE1, into which the respective outcome of user 2, 3 or 4 are input, so that, by using communications controller 302, via optional line 304, a comparison and a voting may be carried out, as well as the corresponding corrective measures. In the first example case, the number of data areas corresponds to the number of the monitored users, so that one data area is clearly allocated to each monitored user. In the second example case, the number of data areas corresponds to the sum of the number of the monitoring and the monitored users, and, as was already described, in this context, an intersection of sets up to a complete agreement of the number of monitored and monitoring users is possible, so that in the extreme case, each user is monitored by all the other users.

Figure 4:
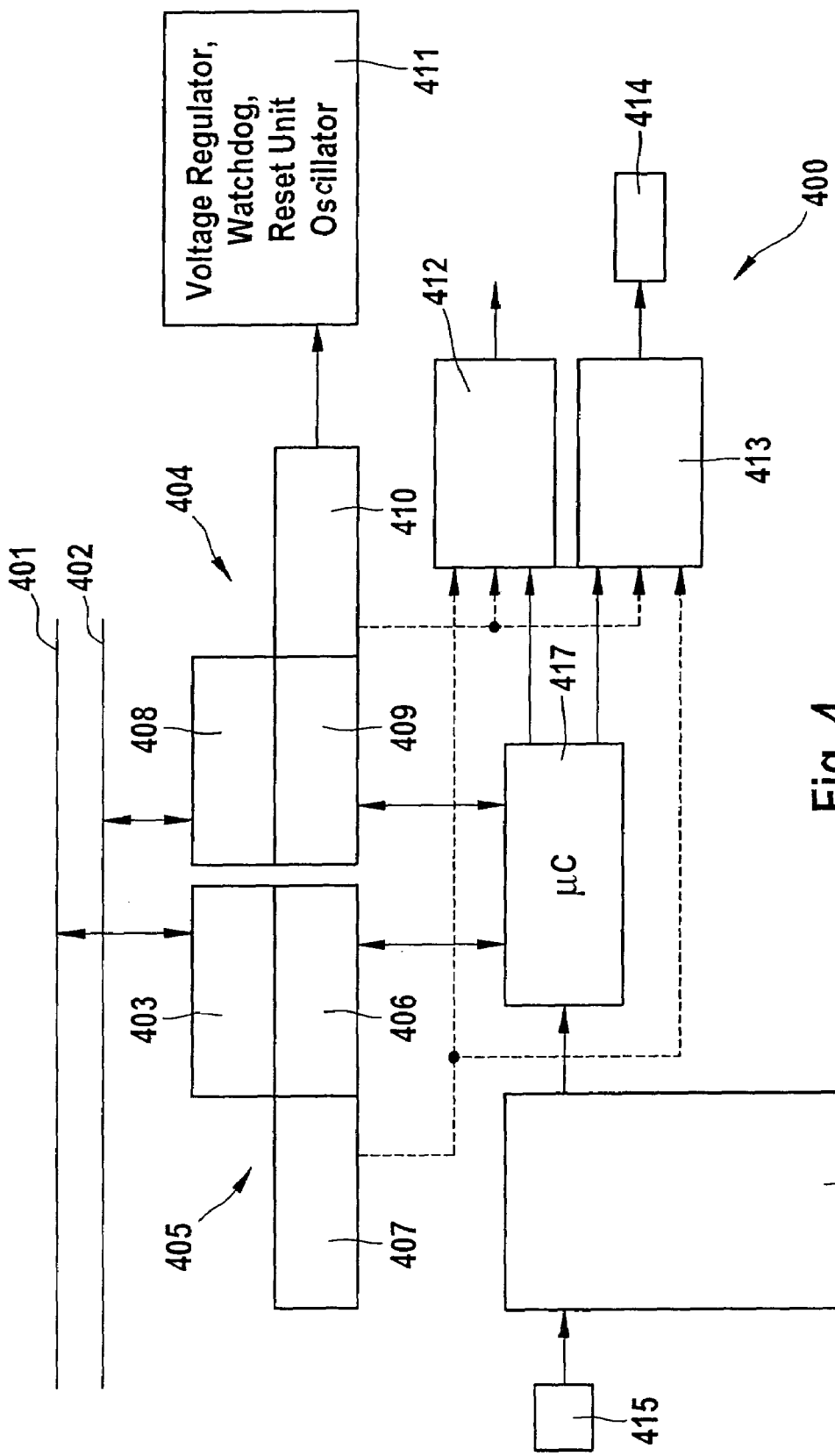
FIG. 4 shows a user in detail, this time with respect to a redundantly designed bus system.

FIG. 4 shows a redundant system having communications connections 401 and 402 for user 400. In this context, two bus coupling-in units 405 and 404 are now provided, of which each is coupled in using a communications connection. Here, too, the bus coupling-in units include a transceiver 403 or 408, a communications controller 406 or 409, as well as a monitoring register, memory unit 407 or 410. Here, too, at least one fault unit 411 is provided, which is operated by the memory unit and bus coupling-in unit 404.

In this context, the fault unit 411 is also able to be operated by the other bus coupling-in unit 405 in the same way, or a second fault unit is provided, for redundancy reasons, i.e. one fault unit per bus coupling-in unit. Both bus coupling-in units are here also connected to computer unit 417, which, in turn, receives input signals from sensors 415 via a sensor signal adaptation unit 416. In the same way, computer unit 417 here forms output signals to a power unit 413 or a signal adaptation unit 412. Power unit 413 here also controls actuators 414.

Using such a redundant system facilitates scalability with respect to the fault security by allocating the data areas in memory units 407 and 410. Thus, the data areas may be distributed, for example, over the two memory units, or they may be provided only partially distributed and partially equal. Thus it is possible to provide some data areas in both memory units 407 and 410, and other data areas in each case only in one memory unit. This brings about a scalable redundancy, using which the system may react very flexibly to security-relevant requirements of the system. Thus, at least a part of the data areas may at least be provided in each bus coupling-in unit of the distributed system, but also in each bus coupling-in unit of this redundant distributed system. This also depends on the number of the monitored and/or monitoring users.

In this manner, a very flexible and yet still simple fault monitoring in a distributed system is achieved.

What is claimed is:

1. A method for monitoring a distributed system having a plurality of user units that are connected by one bus system, comprising:
   providing at least a selected number of the user units as monitoring user units;
   filing process data of at least one monitored user unit in data areas of memory units of the bus system, wherein the monitoring user units have access to the data areas of the memory units; and
   evaluating the process data by the monitoring user units;
   wherein:
   each monitoring user unit generates outcome data as a function of the evaluation of the process data of the at least one monitored user unit; and
   the outcome data are allocated to each monitored user unit and filed in the data areas allocated to the corresponding monitored user units.

2. The method as recited in claim 1, wherein each of the data areas is uniquely allocated to a corresponding monitored user unit.

3. The method as recited in claim 2, wherein the corresponding monitored user unit does not have access to the uniquely allocated data area.

4. The method as recited in claim 2, wherein the data areas are distributed over at least two memory units.

5. The method as recited in claim 2, wherein at least a part of the data areas is provided simultaneously in each memory unit.

6. The method as recited in claim 2, wherein the outcome data include a fault information.

7. The method as recited in claim 2, wherein the outcome data include information on responsive fault measures.

8. The method as recited in claim 2, wherein the outcome data are transmitted via the one bus system to a communications controller of the of the monitored user unit.

9. The method as recited in claim 2, wherein, as a part of the monitoring, a weighted fault determination is made, and wherein the weighted fault determination is made based on an n of m outcome data, m being the number of monitoring user units for a selected monitored user unit, m>2, and n>m/2.

10. The method as recited in claim 1, wherein the outcome data include a fault information.

11. The method as recited in claim 1, wherein the outcome data include information on responsive fault measures.

12. The method as recited in claim 1, wherein the outcome data are transmitted via the one bus system to a communications controller of the monitored user unit.

13. The method as recited in claim 1, wherein the data areas are distributed over at least two memory units.

14. The method as recited in claim 1, wherein at least a part of the data areas is provided simultaneously in each memory unit.

15. The method as recited in claim 1, wherein, as a part of the monitoring, a weighted fault determination is made, and wherein the weighted fault determination is made based on an n of m outcome data, m being the number of monitoring user units for a selected monitored user unit, m>2, and n>m/2.

16. A monitoring system for monitoring a distributed system having a plurality of users that are connected by one bus system, at least a selected number of the users being provided as monitoring user units, comprising:
    a first component for filing process data of at least one monitored user unit in data areas of memory units of the bus system;
    a second component provided in each of the monitoring user units, wherein the second component of each monitoring user unit has access to the data areas of the memory units of the bus system, and wherein the second component of each monitoring user unit evaluates the process data of the at least one monitored user unit;
wherein:
    each monitoring user unit generates outcome data as a function of the evaluation of the process data of the at least one monitored user unit; and
    the outcome data are allocated to each monitored user unit and filed in the data areas allocated to the corresponding monitored user units.

17. The monitoring system as recited in claim 16, wherein each of the memory units is allocated to a corresponding monitoring user unit.

18. A distributed system, comprising:
    a bus system;
    a plurality of units that are connected by the bus system, wherein at least a selected number of the user units are provided as monitoring units; and
    a first component for filing process data of at least one monitored user unit in data areas of memory units of the bus system;
    wherein each of the monitoring units has a second component, and wherein the second component of each monitoring user unit has access to the data areas of the memory units of the bus system, and wherein the second component of each monitoring user unit evaluates the process data of the at least one monitored user;
wherein:
    each monitoring user unit generates outcome data as a function of the evaluation of the process data of the at least one monitored user unit; and
    the outcome data are allocated to each monitored user unit and filed in the data areas allocated to the corresponding monitored user units.

* * * * *